July 3, 1956
C. W. HOBSON
2,753,081
PACKAGES OR CONTAINERS FOR PASTY AND
SIMILAR VISCOUS SUBSTANCES
Filed April 16, 1951
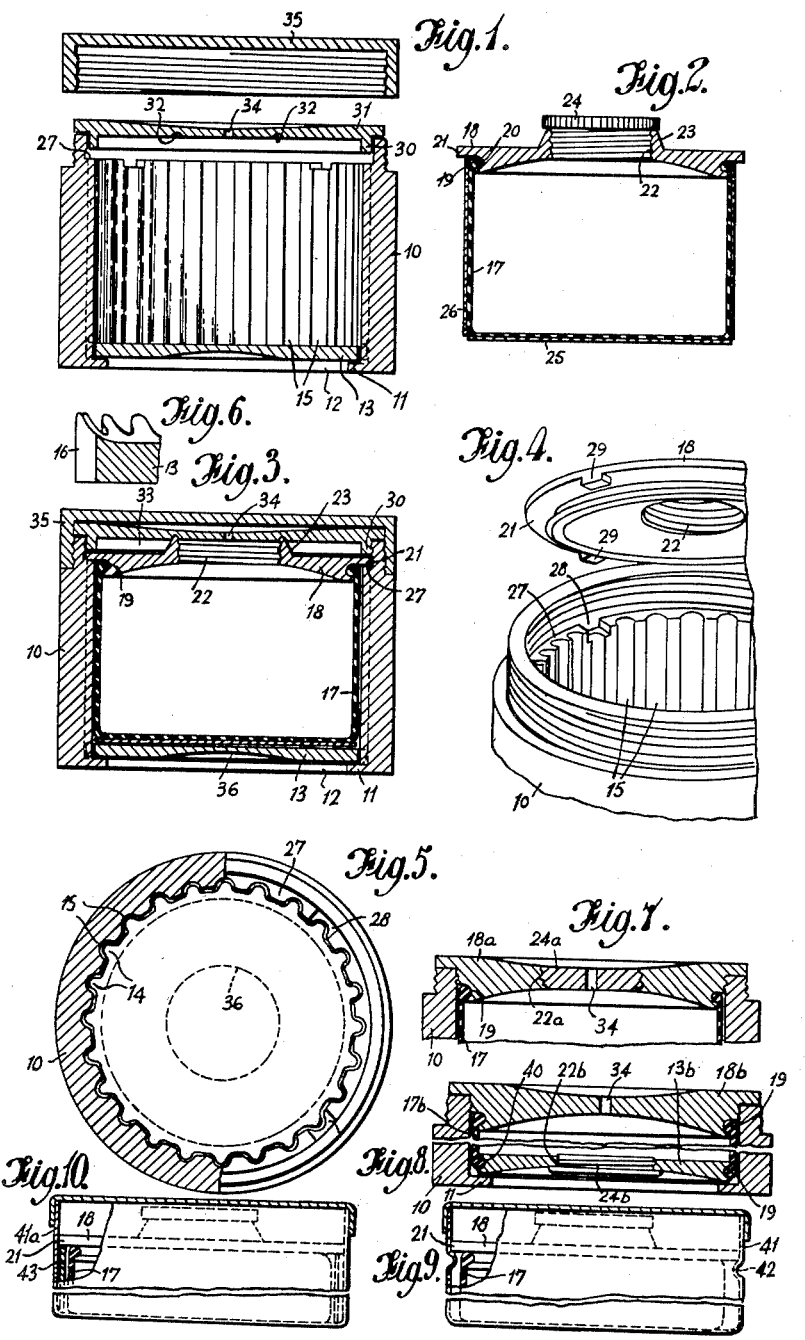
Inventor
CHARLES W. HOBSON
By
Emery Holcombe + Blair
Attorney United States Patent Office 2,753,081
Patented July 3, 1956

2,753,081

PACKAGES OR CONTAINERS FOR PASTY AND SIMILAR VISCOUS SUBSTANCES

Charles William Hobson, Amersham, England

Application April 16, 1951, Serial No. 221,147

Claims priority, application Great Britain April 19, 1950

9 Claims. (Cl. 222—95)

This invention relates to packages or containers for pasty and similar viscous substances, such as cosmetic, toilet and pharmaceutical cream preparations.

A package or container according to the invention has a substantially rigid outer case containing a removable inner collapsible receptacle for the substance, which inner receptacle comprises a collapsible sac open at one end and attached at that end to a substantially rigid disc, plate or like closure member which closes that one end of the sac and which is provided with an aperture through which the sac may be filled, the outer case being open at one end through which the receptacle may be inserted into and removed from the case, and a closure member being detachably secured to that end of the case so as thereby to secure the receptacle in position in the case, the case containing at its other end a disc, plate or like actuating member which is movable longitudinally in the case and is engageable through an aperture in that end of the case, so that said actuating member may be pressed to collapse the sac for expressing a quantity of the contents of the receptacle through an aperture in it.

A feature of the invention is that the inner receptacle, comprising the collapsible sac attached to its substantially rigid closure member, constitutes a unit separable from the outer case. The case may thus be repeatedly usable, whereas the inner receptacle may be removed from the case and discarded when its contents have been exhausted, and may be replaced by a similar, but charged, receptacle. The inner receptacle may thus be marketed as a refill unit, separately from the outer case. Such a unit may be provided with a suitable protective wrapper of paper, cardboard or other suitable material for safeguarding the sac against accidental crushing or damage prior to use. This wrapper may be of a temporary nature, to be removed and discarded when the unit is to be fitted in the outer case. Alternatively, the unit may be marketed in a carton.

The aperture in the closure member of the collapsible receptacle may be made sufficiently large to facilitate filling the receptacle with the desired substance. This large filler opening is closed by a plug which, in one arrangement, may serve as a temporary stopper for the refill unit and may be removed and discarded on fitting the unit into the outer case. In such arrangement, the case may be provided with a removable disc, plate or like member (herein called the dispensing member) which is adapted to be fitted over the closure member of the receptacle so that a portion of the dispensing member closes the aperture in the closure member, said portion having a relatively small dispensing opening therein of any suitable shape, such as a slot, through which the substance in the receptacle is extruded for use on to the outside of the dispensing member when the sac of the receptacle is collapsed. The dispensing member may be removably secured, e. g., screwed, to the case and may be adapted to secure the said closure member (and thereby the inner receptacle) to the case. Means may be provided for preventing leakage of the substance in passing from the filler opening the closure member to the dispensing opening in the dispensing member.

In an alternative arrangement, however, the closure and dispensing members may be combined, in that the closure member is adapted to serve both functions. In this arrangement, the closure member may be provided with the filler opening closed by the plug which, however, is not discarded but remains part of the closure member when the receptacle is fitted into and in use in the outer case, and the plug is provided with the dispensing opening. Alternatively, the closure member may be provided only with the dispensing opening and the sac may be open also at its other end and attached thereat to the actuating member, which closes that end of the sac and thus is incorporated as part of the inner receptacle unit, and which is provided with the filler opening and its plug, the latter again being retained when the receptacle is in use.

The case may be provided with a removable lid so that the dispensing opening and the member provided with the same may be covered when the device is not in use. Guiding means may be provided for guiding the movement along the case of the actuating member which is pressed to collapse the sac of the inner receptacle. The guiding means may be such as to prevent any appreciable rotation or tilting of the actuating member which might cause it to jam.

By way of example and in order that the invention may be more clearly understood, some constructional embodiments thereof will now be described with reference to the accompanying drawings, in which Fig. 1 is a cross-sectional elevation of the outer case with its lid shown detached.

Fig. 2 is a cross-sectional elevation of the inner receptacle constructed as a refill unit.

Fig. 3 is a cross-sectional elevation of the assembled device.

Fig. 4 is a fragmentary perspective view of the upper end of the case and of the closure member of the inner receptacle, showing an arrangement for locating the closure member in the case.

Fig. 5 is a plan view, partly in section, of the outer case showing the actuating member therein.

Fig. 6 is a fragmentary section showing a detail of the actuating member.

Fig. 7 is a fragmentary cross-sectional elevation of a modified embodiment.

Fig. 8 is a fragmentary cross-sectional elevation of a further modification.

Figs. 9 and 10 are elevations, partly in section, showing refill units packed in cartons for marketing.

Referring to Figs. 1 to 6, and particularly Fig. 3, the container illustrated has a substantially rigid outer case 10 in the form of a cylindrical jar which is open at the top, and which may be made, for instance, of glass, metal, cardboard or a plastic. The bottom of the case 10 is provided wih an inwardly directed flange 11 and an opening 12 for access to a movable actuating disc 13 which forms a movable bottom to the case and rests in its lowermost position upon the flange 11, as seen in Figs. 1 and 3. The disc 13 is slidable axially in the case 10 and is guided by peripheral projections 14 (Fig. 5) which engage in corresponding longitudinal recesses or flutes 15 (Figs. 4 and 5) along the internal cylindrical wall of the case, for preventing rotation of the disc 13 in the case and also any appreciable tilting of the disc which might cause it to jam. As an added precaution against tilting, the disc 13 may be formed with a thickened periphery 16, as shown more clearly in Fig. 6, so that it has a sufficient length of bearing against the wall of the outer case to safeguard against tilting.

The outer case 10 receives an inner collapsible receptacle comprising a sac 17 attached at its open end or mouth to a closure disc 18. The sac 17 may be made from a suitable, e. g., thin, pliable material, such as cellulose acetate or other suitable plastic foil, metal foil, plastic and metal foils pressed or bonded together, or paper, e. g., waxed or greaseproof paper, or may be formed as a moulding of rubber or a suitable plastic. The mouth of the sac is formed with a beaded edge 19 which is received in an annular seating groove 20 provided in the periphery of the disc 18. The beaded edge 19 may be secured to the disc in any suitable manner. For instance, if the sac is made of a sufficiently resilient material, its edge 19 may be stretched over the lower edge of the disc 18 so as to spring the edge 19 into the groove 20 and utilize the resiliency of the edge 19 to hold the sac in position. Alternatively, the beaded edge of the sac may be cemented or otherwise fixed in position. The disc 18 also has a peripheral flange 21 by which it (and thereby the complete inner receptacle) may be secured in the case 10, as will presently be described. The disc 18 also has an aperture 22 which is sufficiently large for conveniently filling the sac 17 with the desired substance, and in this embodiment, this filler opening 22 is surrounded by a hollow, internally screw-threaded boss 23 which projects from the upper face of the disc 18 and into which a screw plug 24 (Fig. 2) is fitted as a temporary stopper after the sac 17 has been filled with the desired substance. When the sac has been filled, it may be provided with a protective wrapper to safeguard it against accidental crushing or damage before the receptacle is inserted into the case 10. As an example, such wrapper is shown in Fig. 2 in the form of a protective disc 25, e. g., of cardboard, at the bottom of the sac and a protective band 26, e. g., of paper, around the sac. The inner receptacle unit as described and shown in Fig. 2 constitutes a separate unit from the case 10 and may be marketed as a refill.

When the unit shown in Fig. 2 is required for use, its plug 24 is removed and discarded and the unit is fitted into the case 10, as shown in Fig. 3, so that the flange 21 of the disc 18 seats on an internal annular shoulder 27 provided on the cylindrical wall of the case near its open top end. If desired, the disc 18 (and thereby the receptacle unit) may be located against rotation in the case, and for this purpose the seating surface of the shoulder 27 in the case may be provided with a number of key slots 28 (Figs. 4 and 5), e. g., four equidistantly spaced around the shoulder, which receive corresponding keys 29 (Fig. 4) provided on the flange 21 of the disc 18. However, such locating means are not essential to the invention and may be omitted.

When the receptacle is thus inserted in the case 10, the disc 18 is clamped against the shoulder 27 by the flange 30 of a disc 31 which serves as the dispensing disc of the case 10 and is screwed into the internally screw-threaded upper end of the cylindrical wall of the case, so as to close its top. The disc 31 has in its undersurface an annular groove 32 (Fig. 1) which receives the upper edge of the boss 23 on the disc 18 (see Fig. 3) so as to form a leak-proof seal between the disc 30 and the boss 23 in order to prevent substance expressed through the aperture 22 from leaking into the annular space 33 around the boss and between the discs 18 and 31. If desired, some form of sealing washer (not shown) may be provided in the bottom of the groove 32. In the portion of the disc 31 surrounded by the groove 32 there is provided a relatively small dispensing opening 34, e. g., in the form of a slot, through which the substance in the receptacle is expressed on to the upper surface of the disc 31 when the actuating disc 13 of the case 10 is pressed upwardly against the sac 17. The upper surface of the dispensing disc 31 may be dished as shown.

The case 10 is also provided with a removable screw lid 35 (Figs. 1 and 3) which covers the dispensing disc 31 and its dispensing opening 34 when the container is not in use. The sac 17 is a sufficiently close fit in the cylindrical wall of the case 10 to enable the latter to provide a backing-up support for the sac for the purpose of restraining or preventing transverse expansion or distention of the sac (which might otherwise be disrupted) by its contents in response to the endwise pressure exerted on it from the actuating disc 13. The bottom of the latter may be provided with a dished portion 36 convenient for the user's thumb.

As shown in Fig. 3, the portective disc 25 at the bottom of the sac 17 may be left on the receptacle unit when it is inserted in the outer case, the band 26 having been removed. The disc 25 may, for example, be stuck to the sac. Of course, other variants are possible; for instance, the protective bottom disc 25 may be unattached to the sac and be held by the band 26, both the disc and the band being discarded. On the other hand, a protective wrapping may be employed which affords sufficient protection against accidental pressure prior to use and can be retained on the receptacle without seriously interfering with the collapsing of the sac when the receptacle is in use in the case 10. It will be apparent that when the sac has been exhausted of its contents, the entire receptacle unit, comprising the disc 18 and attached sac 17, may be removed from the case 10 and discarded, and a fresh refill similar to that shown in Fig. 2 may be inserted and fixed in the manner described.

In a modification, as illustrated in Fig. 7, the two discs 18 and 31 of the embodiment above described may be replaced by a single disc 18a serving both functions. In this modification, the sac 17 of the receptacle unit is attached to the closure disc 18a of the unit in the same way as described for the previous embodiment, and the disc 18a is provided, as before, with a large filler opening 22a closed by a screwed-in plug 24a. However, in this case, the boss 23 of Fig. 2 is omitted and the plug 24a is not a temporary fitting but a permanent part of the unit and is provided with the small dispensing opening 34. It will be understood that the plug 24a is removed for filling the sac, and is afterwards inserted, the opening 34, if in the form of a slot, providing a convenient means for screwing in the plug. In order to prevent evaporation of the substance before the receptacle unit is used by the consumer, the opening 34 in the plug 24a may be provided with a removable temporary closure (not shown), such as an adhesive seal or a stopper of rubber or other convenient material. The closure disc 18a in this modification is adapted, like the disc 31 in the previous embodiment, for screwing into the upper end of the case 10, so as to secure the receptacle unit in the case. The upper surface of the disc 18a may be dished like the disc 31 in the previous embodiment. The receptacle unit may be marketed as a refill unit provided with a protective wrapper, such as shown in Fig. 2.

In a further modification, as illustrated in Fig. 8, the sac is also open at its lower end which is attached to and closed by the actuating disc, which is thus incorporated as part of the receptacle unit. As shown in Fig. 8, the sac 17b is open at both ends which are formed with beaded edges 19b, and the sac is attached at its upper end to a closure disc 18b corresponding to the disc 18a in Fig. 7, in the same way as described for the previous embodiments, and in like manner the sac is attached at its lower end to a disc 13b which is provided with a peripheral annular seating groove 40 to receive the beaded edge of the sac. The disc 13b closes the bottom of the sac and also constitutes the movable actuating disc of the complete container. In contrast to the arrangement in Fig. 7, the disc 18b is provided only with the small dispensing opening 34 and the disc 13b is provided with the large filler opening 22b closed by the screwed-in plug 24b which, similarly as in Fig. 7, is not a temporary fitting but a permanent part of the receptacle unit. It will be understood that the plug 24b is removed for filling the sac through the bottom and is afterwards inserted. The dispensing opening 34 in the disc 18b may be provided with a removable temporary closure (not shown), such as an adhesive seal or a stopper of rubber or other convenient material, which may be fitted in order to prevent escape of the substance through the opening 34 when the sac is being filled, and this temporary closure may be retained on the unit in order to prevent evaporation of the substance before it is used by the consumer. As shown, the disc 18b is adapted, like the disc 18a in Fig. 7, for screwing into the upper end of the case 10 so as to secure the receptacle unit in the case. The upper surface of the disc 18b may be dished like the discs 18a and 31 in the previous embodiments. The receptacle unit may be marketed as a refill unit provided with a protective wrapper such as shown in Fig. 2, but in this case the protective disc at the bottom of the sac is not required, since the bottom of the sac is constituted by the rigid disc 13b.

The refill unit, of whatever form within the scope of this invention, may be marketed without a protective wrapping or band as above described, but instead it may be marketed in a protective carton of any suitable material, e. g., cardboard, which is provided with an internal shoulder, ledge or like support on which the peripheral flange of the upper closure disc, such as 18, 18a or 18b, of the receptacle unit rests in order to support the unit, preferably suspended, in the carton. As one example, Fig. 9 shows one form of carton 41 having an internal supporting shoulder 42 formed by inwardly denting the material of the carton wall. Alternatively, as shown in Fig. 10, a supporting ledge or shoulder may be provided by a lining or sleeve 43 fitted into the carton 41a. In Figs. 9 and 10, the receptacle unit constructed as described with reference to Figs. 1 to 6 is shown for the purpose of illustration only, as it will be apparent that similar cartons may be used for other constructions of the receptacle unit, such as those in Figs. 7 and 8.

Although some specific embodiments of the invention have been particularly described in the foregoing and shown in the drawings, it will be understood that the invention is by no means limited to these examples, since numerous modifications may be made without departing from the invention. For example, although in the foregoing specific embodiments the various elements thereof are of a circular or cylindrical form, it will be apparent that containers according to the invention may readily be constructed in like manner which, as to the complete container as well as its component elements, may be of other shapes than circular or cylindrical. Thus, for example, the outer case or jar itself may be of square, rectangular, oval or other non-circular shapes in cross-section, and the other elements of the device correspondingly shaped. In such constructions, the members corresponding to the various discs described would be plate-like members of appropriate non-circular shapes and accordingly their mode of attachment would be not by means of screw threads but by snap or other closing or fastening devices suitable to non-circular shapes, although in such cases it may be desirable that the filler openings and their plugs would still be circular and screw-threaded.

I claim:

1. A container comprising a rigid tubular outer member, a separate removable inner receptacle comprising a rigid disc closure member at one end of said receptacle, side walls attached to and collapsible towards and expandible away from said disc, means closing the opposite end of said inner receptacle, means for locating said inner receptacle in position within said tubular member with its collapsible walls within the outer tubular member, a filling aperture in said rigid disc closure member, a cover plate over said closure member, means for securing said cover plate to the outer tubular member and against longitudinal movement relative thereto, a contents-exit slot in said cover plate in register with the centre of said aperture in said closure member, a rigid pressure plate axially movable within said tubular member and operable to compress the collapsible side walls of said receptacle to expel the contents thereof through said aperture in said closure member and through said slot in said cover plate, and retaining means on the lower part of said tubular member to define the lowermost position of said pressure plate.

2. A container as claimed in claim 1, in which said filling aperture in said closure member is provided with a neck portion and in which the side of said cover plate next adjacent said closure member is provided with a closed-figure groove, said neck-like portion of said filling aperture engaging within said groove.

3. A container as claimed in claim 2, in which said cover plate is dished on its outer surface about said contents-exit slot.

4. A container comprising a rigid tubular outer member, a separate removable receptacle comprising a first rigid disc closure member at one end of said receptacle, side walls attached to and collapsible towards and expandible away from said disc, means for securing said rigid disc to the outer tubular member and against longitudinal movement relative thereto with the collapsible side walls within the outer tubular member, a contents-exit slot in said closure member, a second rigid disc base closure member at the opposite end of said inner receptacle, the bottom of said side walls being attached to said second disc, a filling aperture in said base closure member, a plug in said filling aperture and retaining means on the lower part of said tubular member to define the lowermost position of said base closure member.

5. A refill receptacle comprising a first rigid disc closure member at one end thereof, side walls attached to and collapsible towards and expandable away from said disc, a second rigid disc closure member at the opposite end of said receptacle, the bottom of said side walls being attached to said second rigid disc, a contents-exit slot in said first rigid disc, and a filling aperture in said second rigid disc.

6. A container comprising a substantially rigid outer case and a removable inner collapsible receptacle for the substance to be contained, said inner receptacle comprising a collapsible tubular member open at at least one end, a substantially rigid closure disc attached to said open end of said collapsible tubular member, a discharge aperture in said closure disc through which the contents of the receptacle may be expelled, said outer case being open at one end and said inner receptacle being insertable into and removable from the case through said open end, means for securing said closure disc at said open end of said outer case so that said inner receptacle is contained wholly within the outer case, a radially-inwardly projecting ledge at the other end of said outer case, and a plate-like actuating member normally resting on said ledge and longitudinally movable within said outer case and operable externally through said other end of said case whereby said inner receptacle may be compressed for expulsion of its contents through said discharge aperture.

7. A container comprising a substantially rigid outer case and a removable inner collapsible receptacle for the substance to be contained, said inner receptacle comprising a collapsible tubular member open at at least one end, a substantially rigid closure disc attached to said open end of said collapsible tubular member, a filling aperture in said closure disc, a closure plug in said filling aperture, a discharge aperture in said closure plug through which the contents of the receptacle may be expelled, said outer case being open at one end and said inner receptacle being insertable into and removable from the case through said open end, means for securing said closure disc at said open end of said outer case so that said inner receptacle is contained wholly within the outer case, a radially-inwardly projecting ledge at the other end of said outer case, and a plate-like actuating member normally resting on said ledge and longitudinally movable within said outer case and externally operable through said other end of said case whereby said inner receptacle may be compressed for expulsion of its contents through said discharge aperture.

8. A container comprising a substantially rigid outer case and a removable inner collapsible receptacle for the substance to be contained, said inner receptacle comprising a collapsible tubular member open at at least one end, a substantially rigid closure disc attached to said open end of said collapsible tubular member, a filling aperture in said closure disc, a closure plug in said filling aperture, a discharge aperture in said closure plug through which the contents of the receptacle may be expelled, said outer case being open at one end and said inner receptacle being insertable into and removable from the case through said open end, means for securing said closure disc at said open end of said outer case so that said inner receptacle is contained wholly within the outer case, a radially-inwardly projecting ledge at the other end of said outer case, and a plate-like actuating member secured to the other end of said collapsible inner receptacle and normally resting on said ledge but longitudinally movable within said outer case and externally operable through said other end of said case whereby said inner receptacle may be compressed for expulsion of its contents through said discharge aperture.

9. A container comprising a substantially rigid outer case and a removable inner collapsible receptacle for the substance to be contained, said inner receptacle comprising a collapsible tubular member open at at least one end, a substantially rigid closure disc attached to said open end of said collapsible tubular member, a discharge aperture in said closure disc through which the contents of the receptacle may be expelled, said outer case being open at one end and said inner receptacle being insertable into and removable from the case through said open end, means for securing said closure disc at said open end of said outer case so that said inner receptacle is contained wholly within the outer case, a radially-inwardly projecting ledge at the other end of said outer case, and a plate-like actuating member secured to the other end of said collapsible inner receptacle normally resting on said ledge but longitudinally movable within said outer case and externally operable through an opening in the end of said case remote from the open end thereof whereby said inner receptacle may be compressed for expulsion of its contents through said discharge aperture.

References Cited in the file of this patent

UNITED STATES PATENTS

| | | |
|---|---|---|
| 381,553 | Hollis | Apr. 24, 1888 |
| 580,052 | Lindemeyer, Jr. | Apr. 6, 1897 |
| 1,055,028 | Flynn et al. | Mar. 4, 1913 |
| 1,207,393 | Gammeter | Dec. 5, 1916 |
| 1,823,206 | Maher | Sept. 15, 1931 |
| 1,996,792 | Bystricky et al. | Apr. 9, 1935 |
| 2,471,852 | Bau | May 31, 1949 |
| 2,477,875 | Hutchason | Aug. 2, 1949 |
| 2,627,365 | Gabler | Feb. 3, 1953 |